United States Patent
Toshimitsu et al.

(10) Patent No.: US 10,099,366 B2
(45) Date of Patent: Oct. 16, 2018

(54) ROBOT

(71) Applicant: Seiko Epson Corporation, Tokyo (JP)

(72) Inventors: Shunsuke Toshimitsu, Azumino (JP);
Kazushige Akaha, Azumino (JP);
Kazuto Yoshimura, Matsumoto (JP);
Katsuji Igarashi, Chino (JP)

(73) Assignee: Seiko Epson Corporation (JP)

( * ) Notice: Subject to any disclaimer, the term of this patent is extended or adjusted under 35 U.S.C. 154(b) by 259 days.

(21) Appl. No.: 15/079,248

(22) Filed: Mar. 24, 2016

(65) Prior Publication Data

US 2016/0288336 A1 Oct. 6, 2016

(30) Foreign Application Priority Data

Mar. 31, 2015 (JP) ................. 2015-071198

(51) Int. Cl.
*B25J 9/04* (2006.01)
*B25J 9/00* (2006.01)

(52) U.S. Cl.
CPC ............. *B25J 9/046* (2013.01); *B25J 9/0018* (2013.01)

(58) Field of Classification Search
CPC ... B25J 9/045; B25J 9/046; B25J 9/047; B25J 17/025; B25J 21/005; B25J 9/0018
USPC .......... 414/732, 735, 738, 739, 740
See application file for complete search history.

(56) References Cited

U.S. PATENT DOCUMENTS 9,037,293 B2 5/2015 Gomi et al.
2003/0221504 A1* 12/2003 Stoianovici ............... B25J 9/06
 74/490.04
2014/0360306 A1 12/2014 Mihara et al.

FOREIGN PATENT DOCUMENTS

| JP | 59-232779 A | 12/1984 |
| JP | 09-141592 A | 6/1997 |
| JP | 2014-046401 A | 3/2014 |
| JP | 2014-237187 A | 12/2014 |

* cited by examiner

*Primary Examiner* — Saul Rodriguez
*Assistant Examiner* — Brendan P Tighe
(74) *Attorney, Agent, or Firm* — Harness, Dickey & Pierce, P.L.C.

(57) ABSTRACT

A robot includes a robot arm having an nth (n is an integer equal to or more than one) arm and an (n+1)th arm, the nth arm is rotatable about an nth rotation shaft, the (n+1)th arm is provided on the nth arm rotatably about an (n+1)th rotation shaft in a shaft direction different from a shaft direction of the nth rotation shaft, and, while a distal end of the robot arm is moved from a first point to a second point, a first operation such that the nth arm and the (n+1)th arm overlap as seen from the shaft direction of the (n+1)th rotation shaft and a second operation of rotating the nth arm are performed.

8 Claims, 18 Drawing Sheets

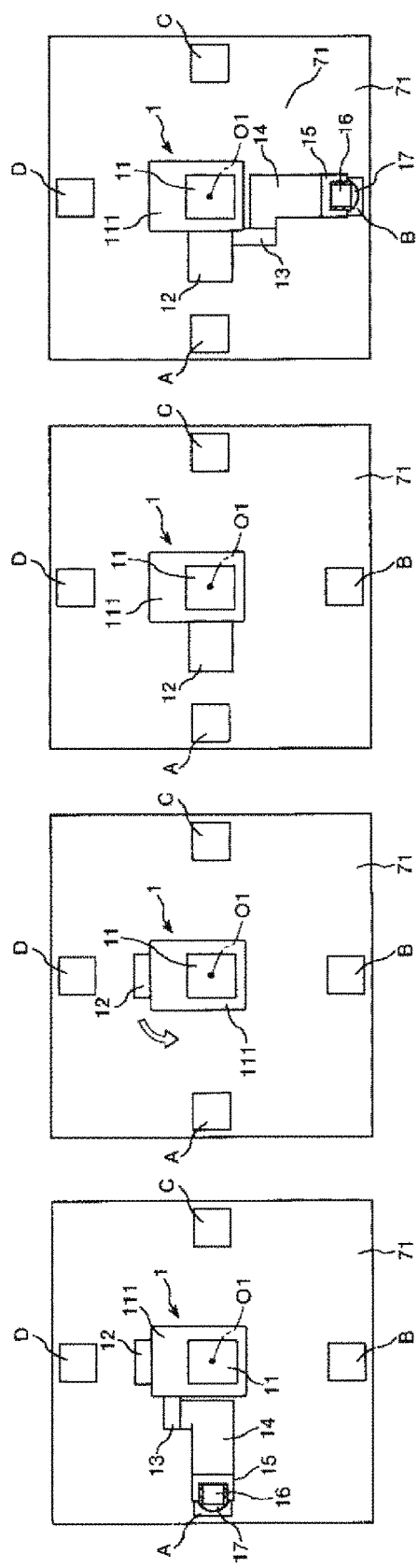

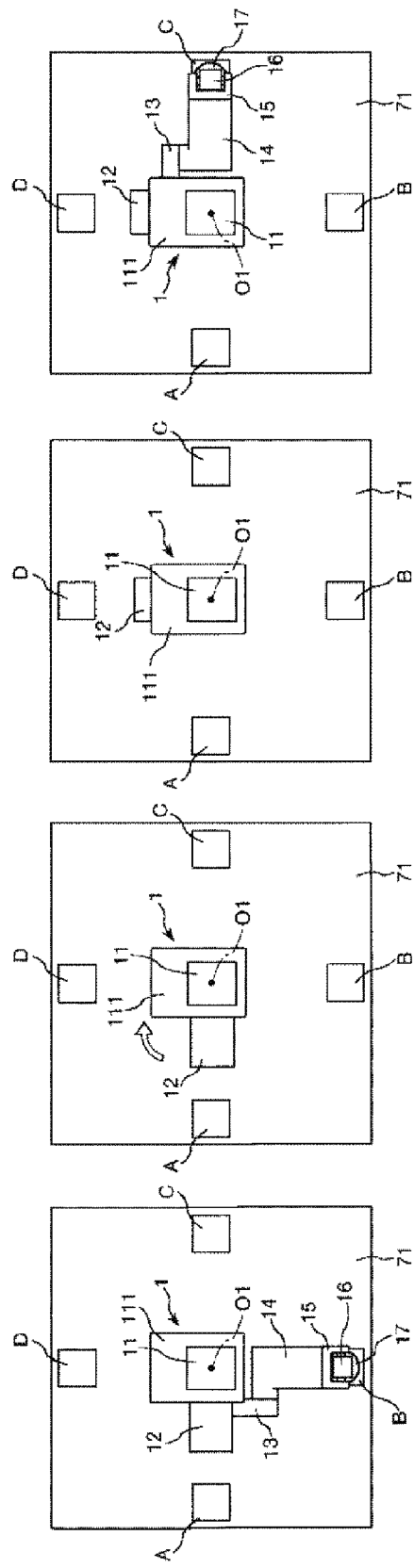

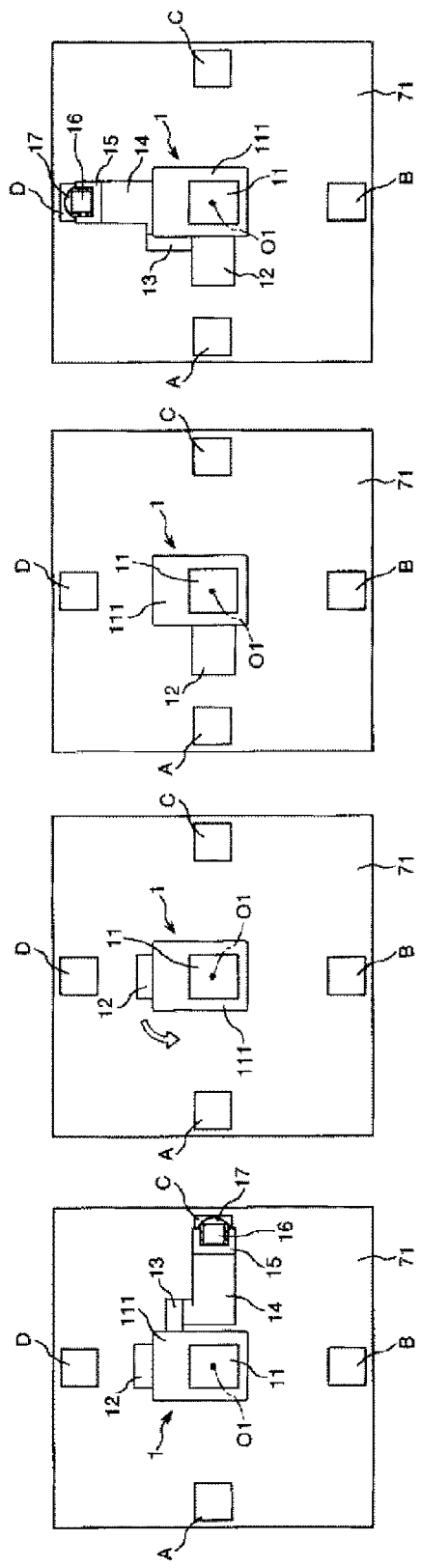

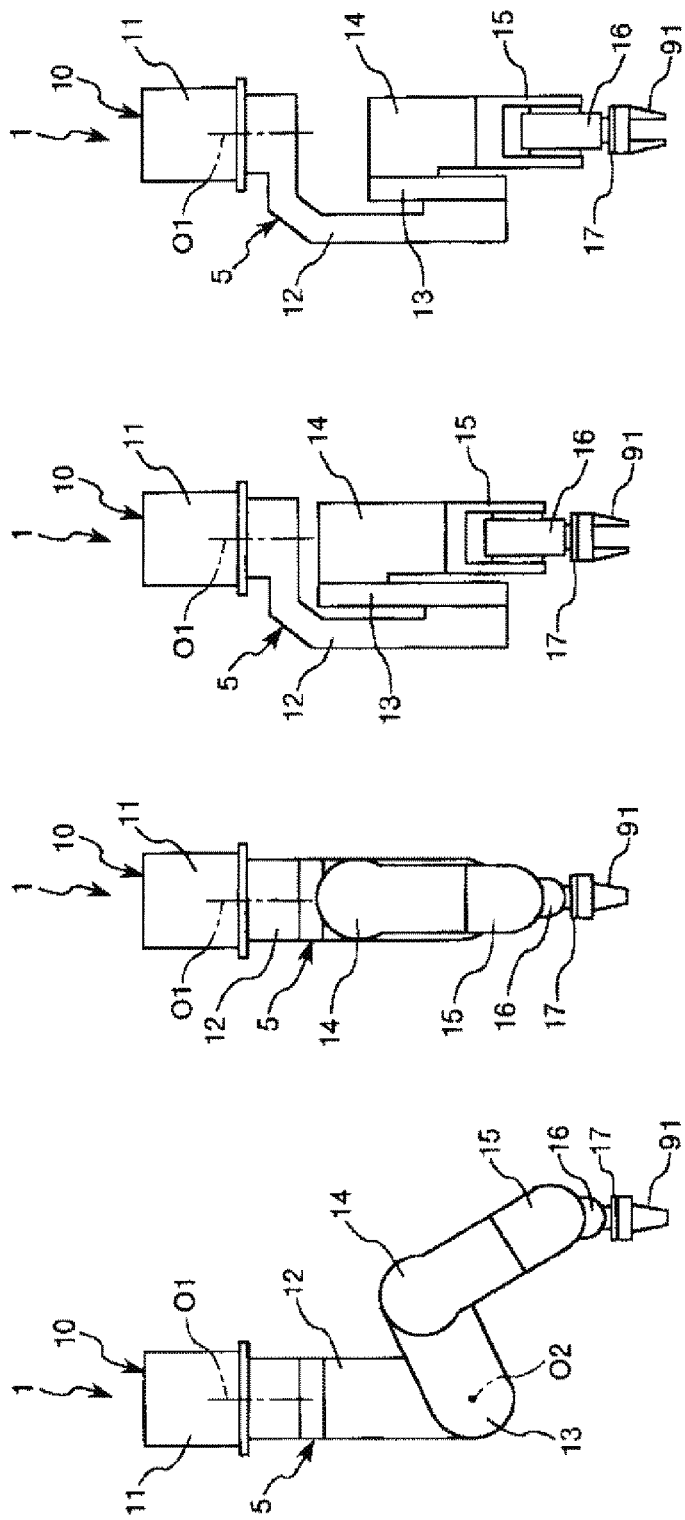

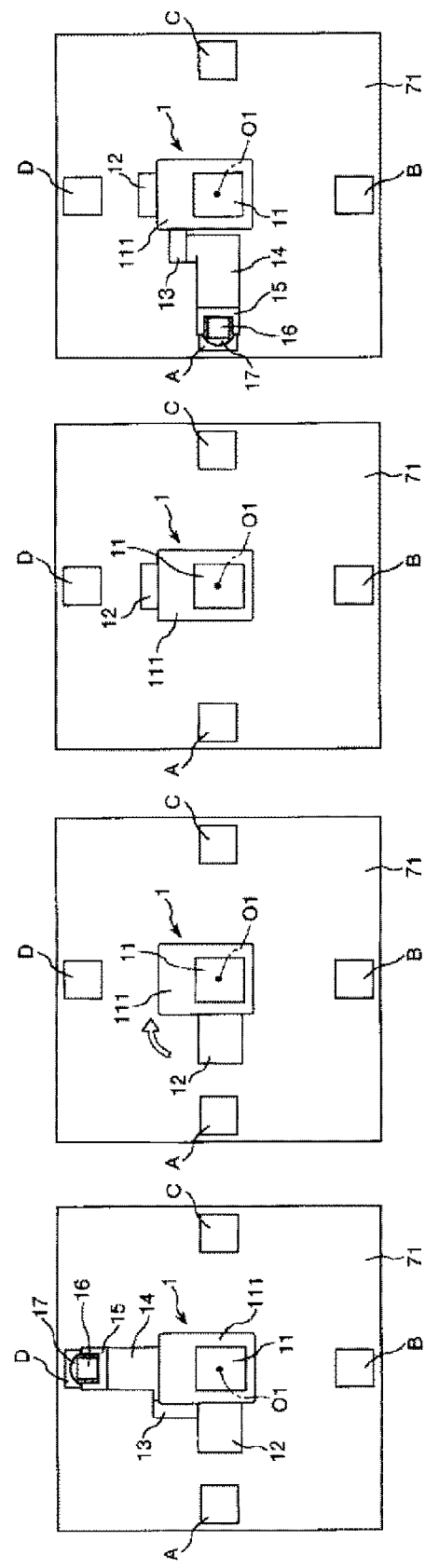

ROBOT

BACKGROUND

1. Technical Field

The present invention relates to a robot.

2. Related Art

In related art, robots with robot arms are known. In the robot arm, a plurality of arms are coupled via joint parts and, as an end effector, e.g. a hand is attached to the arm on the most distal end side (on the most downstream side). The joint parts are driven by motors and the arms rotate by the driving of the joint parts. Then, for example, the robot grasps an object with the hand, moves the object to a predetermined location, and performs predetermined work such as assembly.

As the robot, for example, Patent Document 1 (JP-A-2014-46401) discloses a vertical articulated robot. The vertical articulated robot described in Patent Document 1 has a base, a plurality of arms coupled to the base, an end effector (wrist) provided on the arm. The vertical articulated robot holds an object (work) with the end effector and rotates the plurality of arms with respect to the base, and thereby, moves the end effector and carries the object.

Further, for example, Patent Document 2 (JP-A-2014-237187) discloses a parallel link robot. The parallel link robot described in Patent Document 2 has a robot main body, three arm parts connected to the robot main body, an end part connected to these arm parts, and an end effector provided on the end part. The parallel link robot holds an object (work) with the end effector, and moves the end effector by cooperation of the three arm parts and carries the object.

However, in the robots of related art like those in Patent Document 1 and Patent Document 2, an operation range in which the distal end of the robot arm can move is small and it may be difficult to move an object to a target location.

SUMMARY

An advantage of some aspects of the invention is to solve at least a part of the problems described above, and the can be implemented as the following forms or application examples.

Application Example 1

A robot according to this application example of the invention includes a robot arm having an nth (n is an integer equal to or more than one) arm and an (n+1)th arm, the nth arm rotatable about an nth rotation shaft, the (n+1) th arm provided on the nth arm rotatably about an (n+1)th rotation shaft in a shaft direction different from a shaft direction of the nth rotation shaft, and, while a distal end of the robot arm is moved from a first point to a second point, a first operation such that the nth arm and the (n+1)th arm overlap as seen from the shaft direction of the (n+1)th rotation shaft and a second operation of rotating the nth arm are performed.

With this configuration, an operation range in which the distal end of the robot arm can move can be made larger than that of related art. Further, the second operation can be performed, and thereby, when the distal end of the robot arm is moved from the first point to the second point different by 180° about the nth rotation shaft, the distal end of the robot arm can be moved to the second point without rotation of the nth arm. Therefore, the first operation and the second operation are performed, and thereby, for example, the distal end of the robot arm can be rotated to an angle more than 360° about the nth rotation shaft without rotation of the nth arm to an angle more than 360° about the nth rotation shaft.

Application Example 2

In the robot according to the application example of the invention, it is preferable that the first operation is an operation such that an angle formed by the nth arm and the (n+1)th arm is 0° as seen from the shaft direction of the (n+1)th rotation shaft.

With this configuration, for example, when the distal end of the robot arm is moved from the first point to the second point different by 180° about the nth rotation shaft, the distal end of the robot arm can be moved to the second point without rotation of the nth arm. Therefore, the distal end of the robot arm can be rotated to an angle more than 360° about the nth rotation shaft more easily without rotation of the nth arm to an angle more than 360° about the nth rotation shaft.

Application Example 3

In the robot according to the application example of the invention, it is preferable that the second operation is performed after the first operation.

With this configuration, the distal end of the robot arm can be moved in a path sequentially passing through the first point, on the nth rotation shaft, and the second point as seen from the nth rotation shaft. Accordingly, for example, when there is an obstacle or the like between the first point and the second point, collision of the distal end of the robot arm with the obstacle can be avoided.

Application Example 4

In the robot according to the application example of the invention, it is preferable that the second operation is performed while the first operation is performed.

With this configuration, the distal end of the robot arm can be allowed to reach the second point from the first point in a shorter path.

Application Example 5

In the robot according to the application example of the invention, it is preferable that a rotation angle of the nth arm is from −135° to +135° in the second operation.

When the distal end of the robot arm is moved from the first point to the second point different by 180° about the nth rotation shaft, the distal end of the robot arm can be moved to the second point without rotation of the nth arm. Thereby, even when the nth arm is rotated within the above described range, the distal end of the robot arm can be rotated to an angle more than 360° about the nth rotation shaft.

Application Example 6

In the robot according to the application example of the invention, it is preferable that a length of the nth arm is longer than a length of the (n+1)th arm.

With this configuration, when the distal end of the robot arm is moved from the first point to the second point different by 180° about the nth rotation shaft, the distal end of the robot arm can be moved to the second point more easily without rotation of the nth arm.

Application Example 7

In the robot according to the application example of the invention, it is preferable that the robot includes a base, and the nth arm is provided on the base.

With this configuration, the nth arm can be rotated with respect to the base.

Application Example 8

A robot according to this application example of the invention includes a robot arm having an nth (n is an integer equal to or more than one) arm and an (n+1)th arm, the nth arm rotatable about an nth rotation shaft, the (n+1) th arm provided on the nth arm rotatably about an (n+1)th rotation shaft in a shaft direction different from a shaft direction of the nth rotation shaft, and, when a distal end of the robot arm is rotated to 360°×m (m is equal to or more than ±2) about the nth rotation shaft as seen from the shaft direction of the nth rotation shaft, a rotation angle of the nth arm is larger than −360° and smaller than +360°.

With this configuration, the operation range in which the distal end of the robot arm can move can be made larger than that of related art. Further, the second operation can be performed, and thereby, when the distal end of the robot arm is moved from the first point to the second point different by 180° about the nth rotation shaft, the distal end of the robot arm can be moved to the second point without rotation of the nth arm. Therefore, the first operation and the second operation are performed, and thereby, for example, the distal end of the robot arm can be rotated to an angle more than 360° about the nth rotation shaft without rotation of the nth arm to an angle more than 360° about the nth rotation shaft.

BRIEF DESCRIPTION OF THE DRAWINGS

The invention will be described with reference to the accompanying drawings, wherein like numbers reference like elements.

FIGS. 8A to 8D are top views for explanation of actions of the robot when the distal end of the robot arm shown in FIG. 1 is moved from a position A to a position B.

FIGS. 10A to 10D are top views for explanation of actions of the robot when the distal end of the robot arm shown in FIG. 1 is moved from the position B to a position C.

FIGS. 12A to 12D are top views for explanation of actions of the robot when the distal end of the robot arm shown in FIG. 1 is moved from the position C to a position D.

FIGS. 13A to 13D are side views for explanation of the actions of the robot when the distal end of the robot arm shown in FIG. 1 is moved from the position C to the position D.

FIGS. 14A to 14D are top views for explanation of actions of the robot when the distal end of the robot arm shown in FIG. 1 is moved from the position D to the position A.

DESCRIPTION OF EXEMPLARY EMBODIMENTS

As below, a robot according to the invention will be explained in detail based on preferred embodiments shown in the accompanying drawings.

Figure 1:
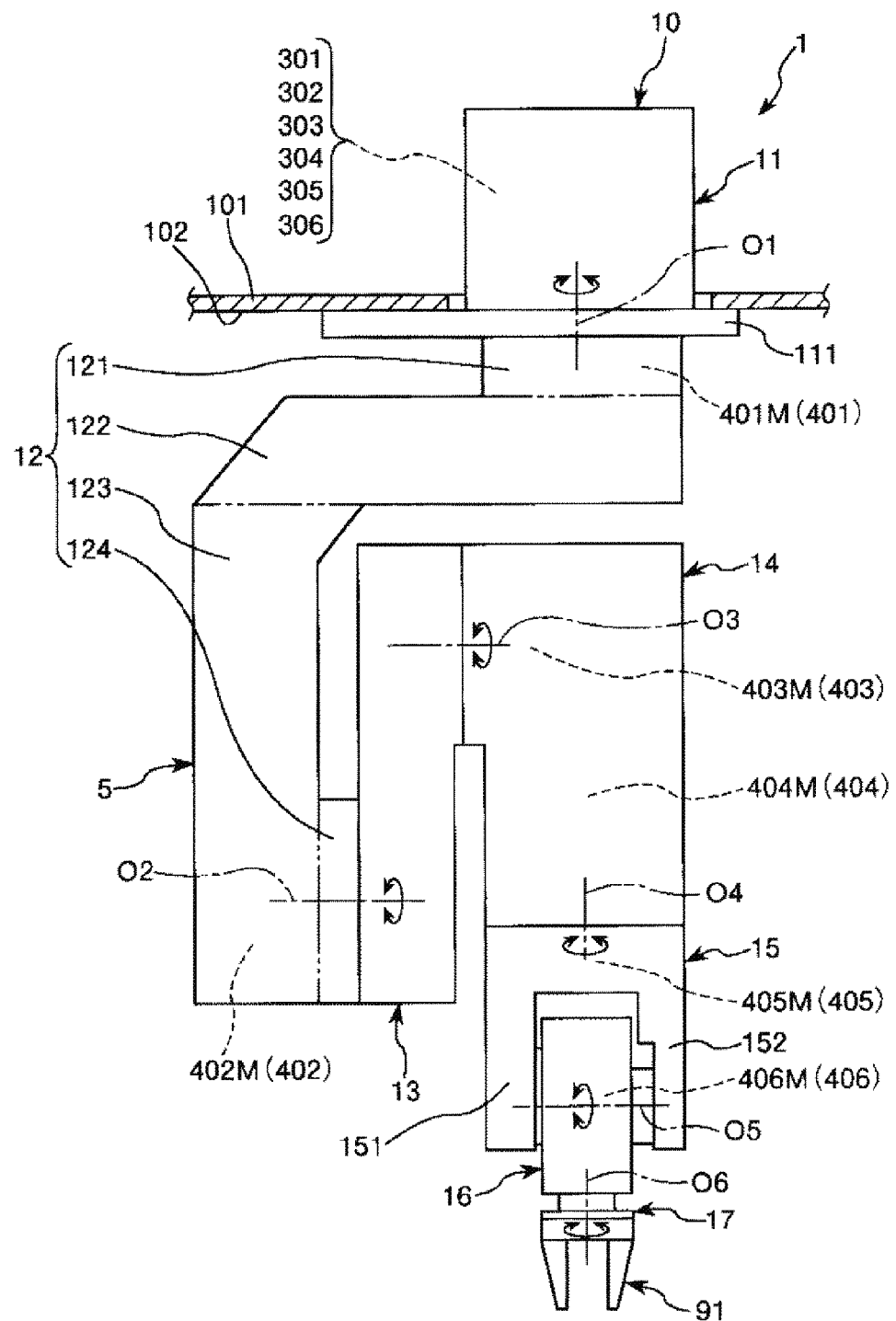
FIG. 1 is a front view showing a preferred embodiment of a robot according to the invention.
Figure 2:
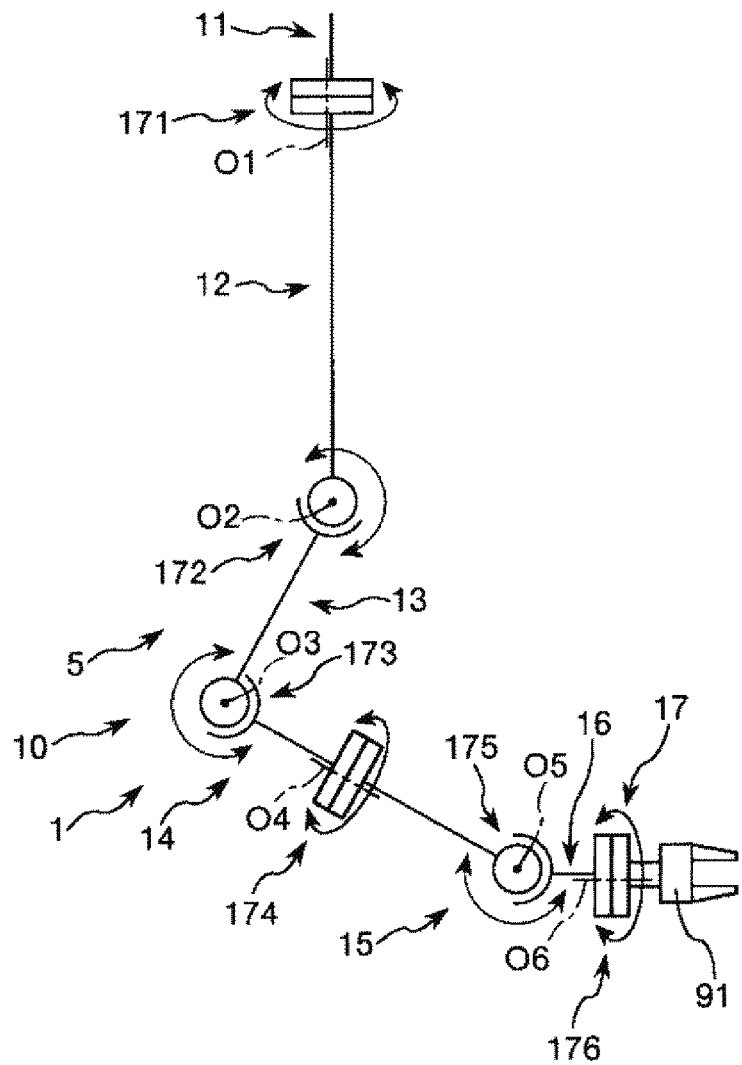
FIG. 2 is a schematic diagram of the robot shown in FIG. 1.
Figure 3:
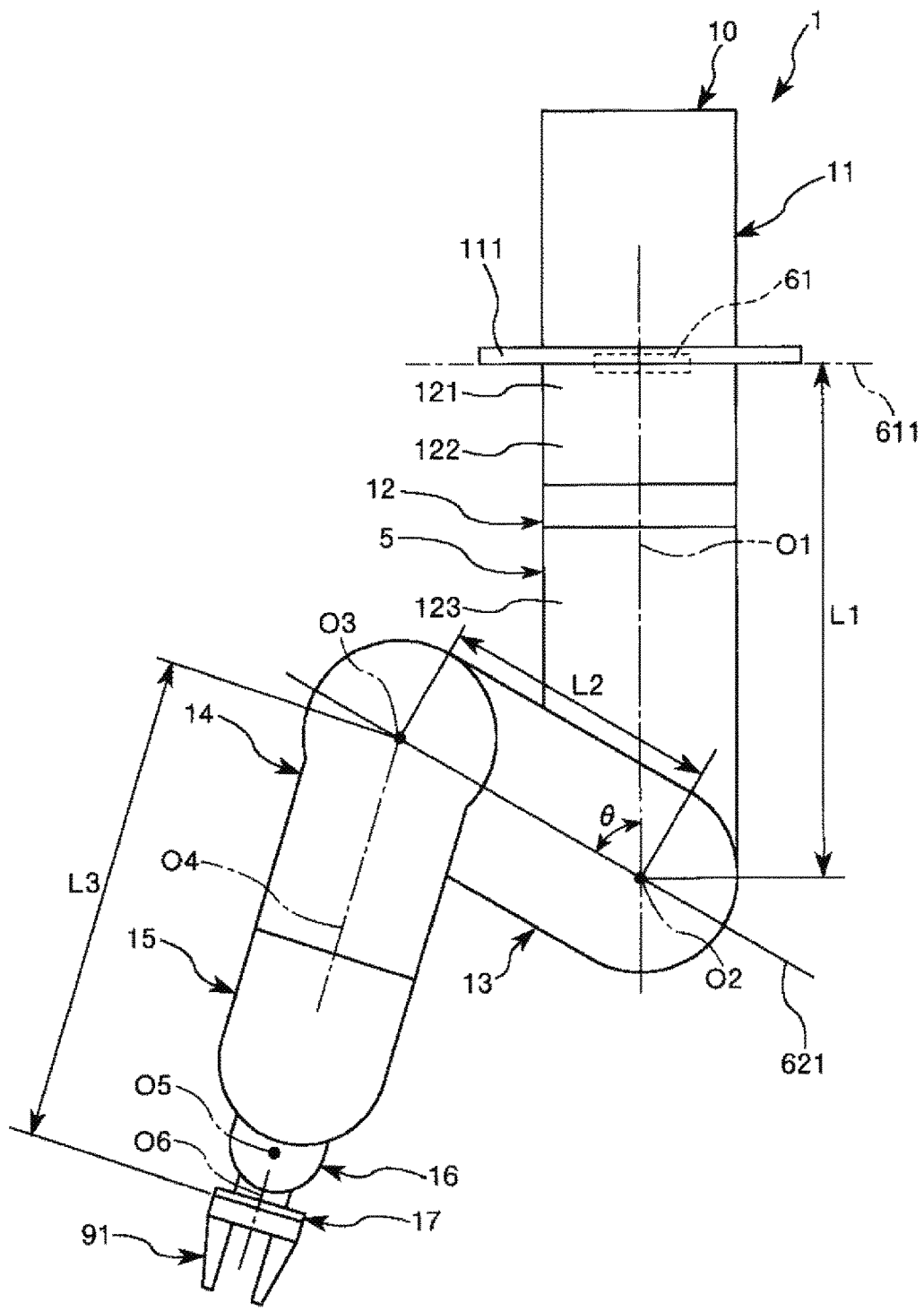
FIG. 3 is a side view of the robot shown in FIG. 1.
Figure 4:
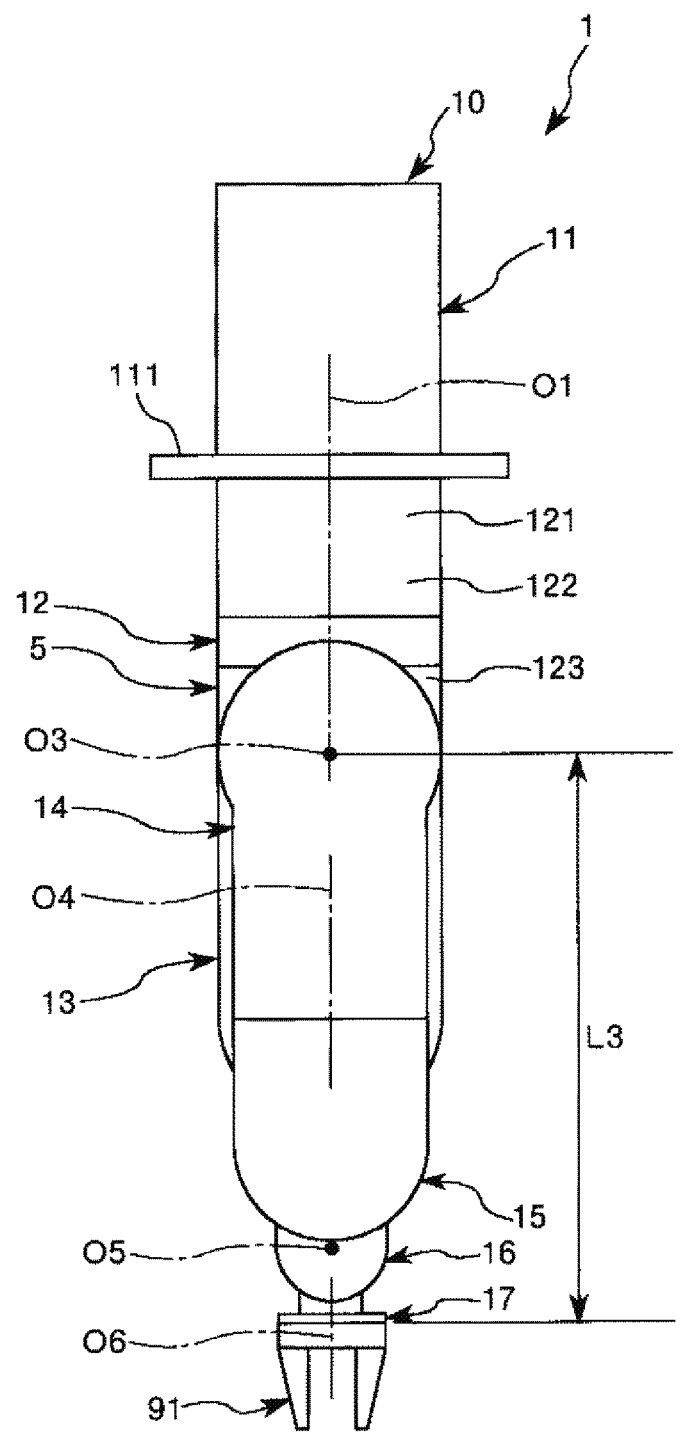
FIG. 4 is a side view of the robot shown in FIG. 1.
Figure 5:
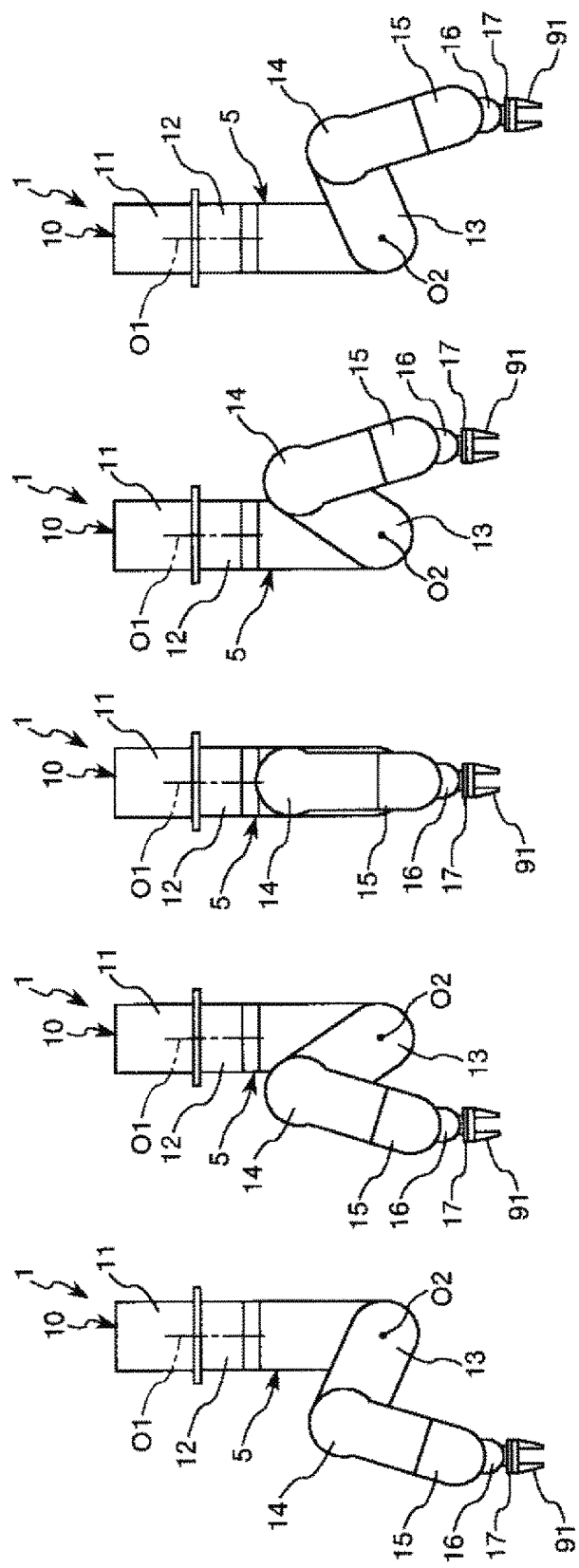
FIGS. 5A to 5E are diagrams for explanation of actions of the robot shown in FIG. 1.
Figure 6:
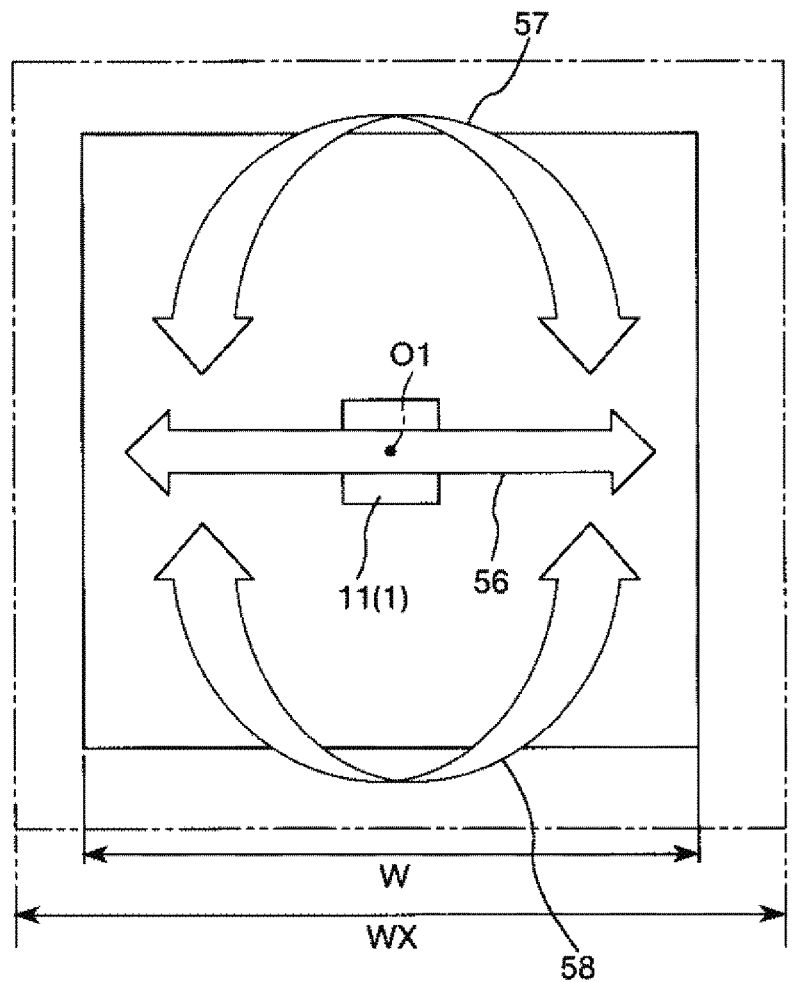
FIG. 6 is a diagram for explanation of movements of a distal end of a robot arm of the robot shown in FIG. 1.
Figure 7:
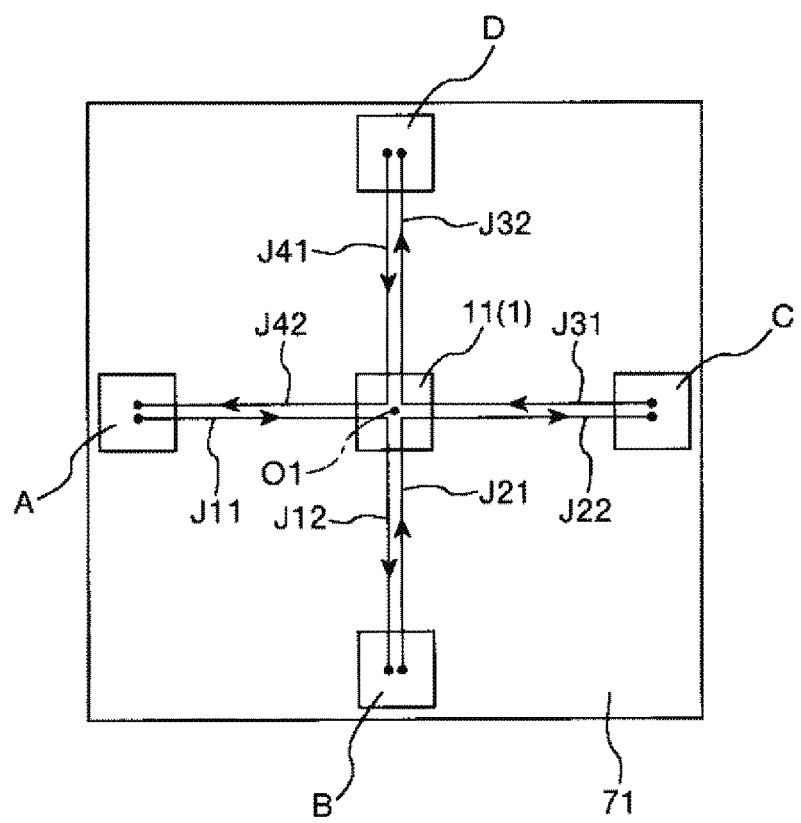
FIG. 7 is a diagram for explanation of movement paths of the distal end of the robot arm of the robot shown in FIG. 1 at work.
Figure 16:
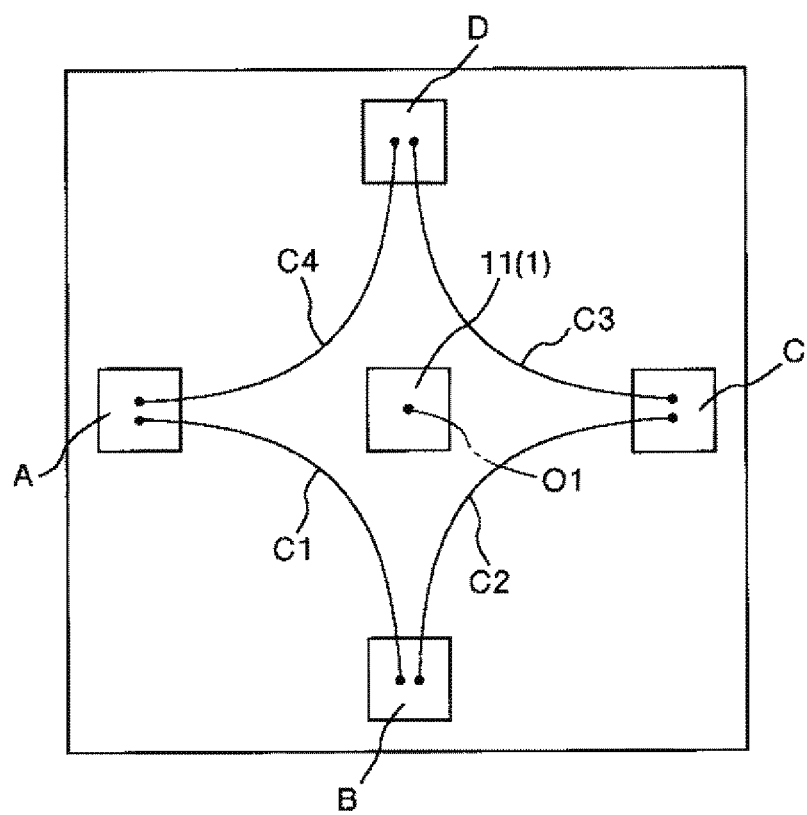
FIG. 16 shows another example of the movement paths of the distal end of the robot arm of the robot shown in FIG. 1 at work.
Figure 17A:
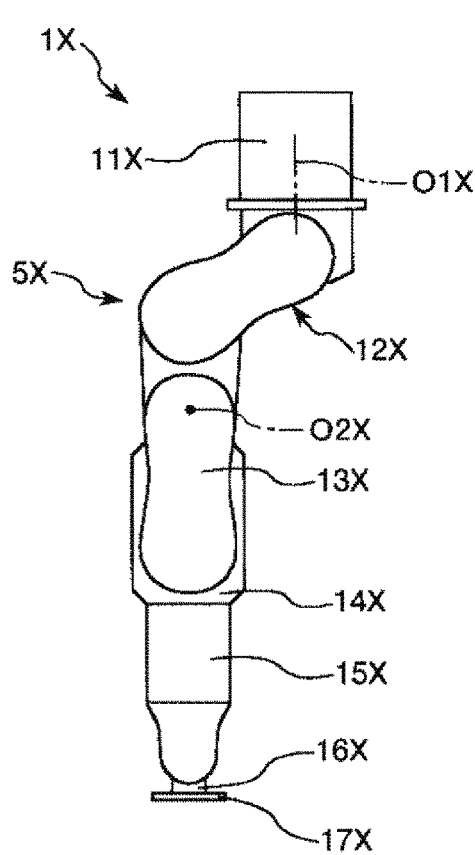
FIGS. 17A and 17B show the robot shown in FIG. 1 and a robot of related art.
Figure 17B:
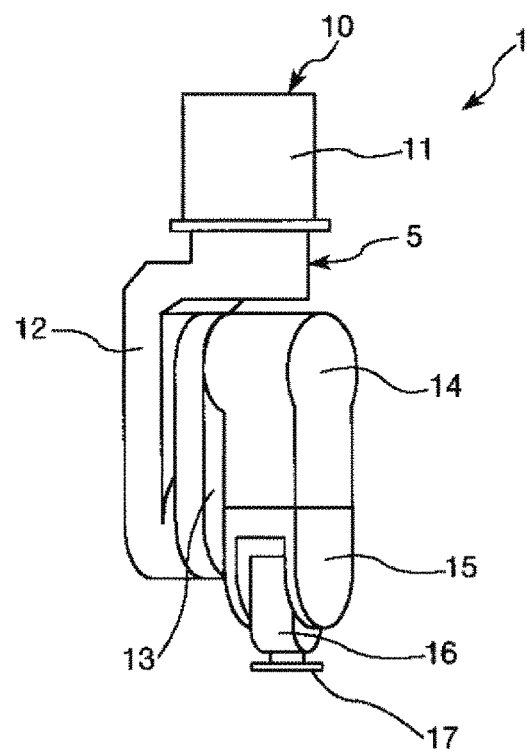
Figure 18:
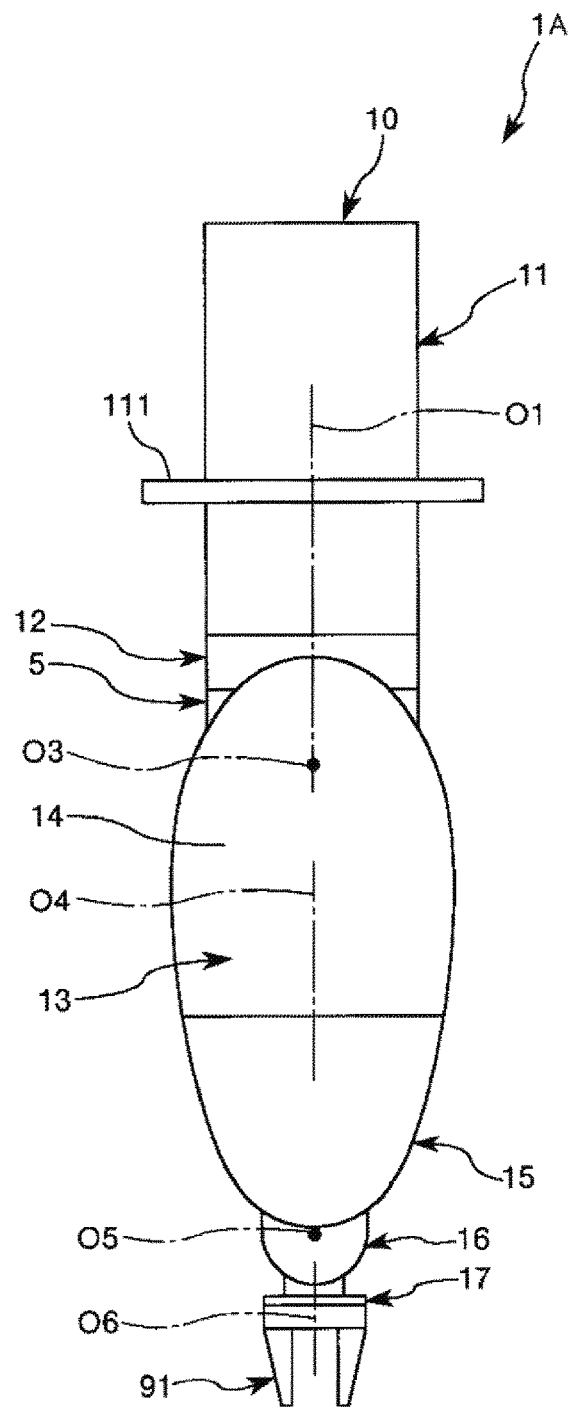
FIG. 18 shows a modified example of the robot shown in FIG. 1.

FIG. 1 is a front view showing a preferred embodiment of a robot according to the invention. FIG. 2 is a schematic diagram of the robot shown in FIG. 1. FIG. 3 is a side view of the robot shown in FIG. 1. FIG. 4 is a side view of the robot shown in FIG. 1. FIGS. 5A to 5E are diagrams for explanation of actions of the robot shown in FIG. 1. FIG. 6 is a diagram for explanation of movements of a distal end of a robot arm of the robot shown in FIG. 1. FIG. 7 is a diagram for explanation of movement paths of the distal end of the robot arm of the robot shown in FIG. 1 at work. FIGS. 8A to 8D are top views for explanation of actions of the robot when the distal end of the robot arm shown in FIG. 1 is moved from a position A to a position B. FIGS. 9A to 9D are side views for explanation of the actions of the robot when the distal end of the robot arm shown in FIG. 1 is moved from the position A to the position B. FIGS. 10A to 10D are top views for explanation of actions of the robot when the distal end of the robot arm shown in FIG. 1 is moved from the position B to a position C. FIGS. 11A to 11D are side views for explanation of the actions of the robot when the distal end of the robot arm shown in FIG. 1 is moved from the position B to the position C. FIGS. 12A to 12D are top views for explanation of actions of the robot when the distal end of the robot arm shown in FIG. 1 is moved from the position C to a position D. FIGS. 13A to 13D are side views for explanation of the actions of the robot when the distal end of the robot arm shown in FIG. 1 is moved from the position C to the position D. FIGS. 14A to 14D are top views for explanation of actions of the robot when the distal end of the robot arm shown in FIG. 1 is moved from the position D to the position A. FIGS. 15A to 15D are side views for explanation of the actions of the robot when the distal end of the robot arm shown in FIG. 1 is moved from the position D to the position A. FIG. 16 shows another example of the movement paths of the distal end of the robot arm of the robot shown in FIG. 1 at work. FIGS. 17A and 17B show the robot shown in FIG. 1 and a robot of related art. FIG. 18 shows a modified example of the robot shown in FIG. 1.

Hereinafter, for convenience of explanation, the upside in FIGS. 1 to 5E, 9A to 9D, 11A to 11D, 13A to 13D, 15A to 15D, 17A and 17B, and 18 is referred to as "up" or "upper" and the downside is referred to as "low" or "lower", the upward and downward directions are referred to as "vertical directions" and the leftward and rightward directions are referred to as "horizontal directions". Further, the base side in FIGS. 1 to 5E, 9A to 9D, 11A to 11D, 13A to 13D, 15A to 15D, 17A and 17B, and 18 is referred to as "proximal end" or "upstream" and the opposite side (the hand side) is referred to as "distal end" or "downstream".

A robot (industrial robot) 1 shown in FIG. 1 includes a robot main body (main body unit) 10 and a robot control apparatus (control unit) (not shown) that controls operation of the robot main body 10 (robot 1). For example, the robot 1 may be used in a manufacturing process of manufacturing precision apparatuses such as wristwatches or the like. The robot 1 may perform work of feeding, removing, carrying, and assembly of the precision apparatuses and parts forming the apparatuses. The robot control apparatus may be provided inside of the robot main body 10, or separated from the robot main body 10. Further, the robot control apparatus may be formed using e.g. a personal computer (PC) containing a CPU (Central Processing Unit) or the like.

The robot main body 10 includes a base (supporting part) 11 and a robot arm 5. The robot arm 5 includes a first arm (nth arm) 12, a second arm ((n+1)th arm) 13, a third arm 14, a fourth arm 15, a fifth arm 16, and a sixth arm 17 (six arms), and a first drive source 401, a second drive source 402, a third drive source 403, a fourth drive source 404, a fifth drive source 405, and a sixth drive source 406 (six drive sources). For example, an end effector such as a hand 91 that grasps a precision apparatus such as a wristwatch, a part, or the like may be detachably attached to the distal end of the sixth arm 17.

The robot 1 having the robot main body 10 is a vertical articulated (six-axis) robot in which the base 11, the first arm 12, the second arm 13, the third arm 14, the fourth arm 15, the fifth arm 16, and the sixth arm 17 are sequentially coupled from the proximal end side toward the distal end side. As below, the first arm 12, the second arm 13, the third arm 14, the fourth arm 15, the fifth arm 16, and the sixth arm 17 will be respectively also referred to as "arm". The first drive source 401, the second drive source 402, the third drive source 403, the fourth drive source 404, the fifth drive source 405, and the sixth drive source 406 will be respectively also referred to as "drive source (drive unit)".

As shown in FIG. 1, the base 11 is a part fixed (member attached) to e.g. a ceiling surface 102 as a lower surface of a ceiling 101 as an installation space. The fixing method is not particularly limited, but e.g. a fixing method using a plurality of bolts or the like may be employed.

In the embodiment, a plate-like flange 111 provided in the lower part of the base 11 is attached to the ceiling surface 102, however, the attachment location of the base 11 to the ceiling surface 102 is not limited to that. For example, the location may be an upper surface of the base 11.

Further, the base 11 may include a joint 171, which will be described later, or not (see FIG. 2).

As shown in FIG. 1, the robot arm 5 is rotatably supported with respect to the base 11 and the arms 12 to 17 are respectively supported to be independently displaceable with respect to the base 11.

The first arm 12 has a bending shape. The first arm 12 has a first portion 121 connected to the base 11 and extending downward in the vertical direction from the base 11, a second portion 122 extending in the horizontal direction from the lower end of the first portion 121, a third portion 123 provided on an opposite end of the second portion 122 to the first portion 121 and extending in the vertical direction, and a fourth portion 124 extending in the horizontal direction from the distal end of the third portion 123. These first portion 121, second portion 122, third portion 123, and fourth portion 124 are integrally formed. Further, the second portion 122 and the third portion 123 are nearly orthogonal (crossing) as seen from the near side of the paper surface of FIG. 1 (in a front view orthogonal to both a first rotation shaft O1 and a second rotation shaft O2, which will be described later).

The second arm 13 has a longitudinal shape and is connected to the distal end of the first arm 12 (the opposite end of the fourth portion 124 to the third portion 123).

The third arm 14 has a longitudinal shape and is connected to the opposite end of the second arm 13 to the end to which the first arm 12 is connected.

The fourth arm 15 is connected to the opposite end of the third arm 14 to the end to which the second arm 13 is connected. The fourth arm 15 has a pair of supporting portions 151, 152 opposed to each other. The supporting portions 151, 152 are used for connection to the fifth arm 16.

The fifth arm 16 is located between the supporting portions 151, 152 and connected to the supporting portions 151, 152, and thereby, coupled to the fourth arm 15.

The sixth arm 17 has a flat plate shape and is connected to the distal end of the fifth arm 16. Further, the hand 91 is detachably attached to the distal end of the sixth arm 17 (the opposite end to the fifth arm 16). The hand 91 includes, but not particularly limited to, e.g. a configuration having a plurality of finger portions (fingers).

Each of the exteriors of the above described respective arms 12 to 17 may be formed by a single member or a plurality of members.

Next, referring to FIGS. 1 and 2, the drive sources 401 to 406 with driving of these arms 12 to 17 will be explained. FIG. 2 shows the schematic view of the robot 1 as seen from the right side in FIG. 1. Further, FIG. 2 shows a state in which the arms 13 to 17 have been rotated from the state shown in FIG. 1.

As shown in FIG. 2, the base 11 and the first arm 12 are coupled via the joint 171. The joint 171 has a mechanism that rotatably supports the first arm 12 coupled to the base 11 with respect to the base 11. Thereby, the first arm 12 is rotatable around the first rotation shaft (an nth rotation shaft) O1 in parallel to the vertical direction (about the first rotation shaft O1) with respect to the base 11. The first rotation shaft O1 is aligned with a normal of the ceiling surface 102 to which the base 11 is attached. Further, the first rotation shaft O1 is a rotation shaft on the most upstream side of the robot 1. The rotation about the first rotation shaft O1 is performed by driving of the first drive source 401 having a motor 401M. Further, the first drive source 401 is driven by the motor 401M and a cable (not shown), and the motor 401M is controlled by a robot control apparatus via a motor driver 301 electrically connected thereto. Note that the first drive source 401 may be adapted to transmit the drive power from the motor 401M by a reducer (not shown) provided with the motor 401M, or the reducer may be omitted.

The first arm 12 and the second arm 13 are coupled via a joint 172. The joint 172 has a mechanism that rotatably supports one of the first arm 12 and the second arm 13 coupled to each other with respect to the other. Thereby, the second arm 13 is rotatable around the second rotation shaft O2 in parallel to the horizontal direction (about the second rotation shaft O2) with respect to the first arm 12. The second rotation shaft O2 is orthogonal to the first rotation shaft O1. The rotation about the second rotation shaft O2 is performed by driving of the second drive source 402 having a motor 402M. Further, the second drive source 402 is driven by the motor 402M and a cable (not shown), and the motor 402M is controlled by the robot control apparatus via a motor driver 302 electrically connected thereto. Note that the second drive source 402 may be adapted to transmit the drive power from the motor 402M by a reducer (not shown) provided with the motor 402M, or the reducer may be omitted. The second rotation shaft O2 may be parallel to the shaft orthogonal to the first rotation shaft O1, or the second rotation shaft O2 may be different in shaft direction from the first rotation shaft O1, not orthogonal thereto.

The second arm 13 and the third arm 14 are coupled via a joint 173. The joint 173 has a mechanism that rotatably supports one of the second arm 13 and the third arm 14 coupled to each other with respect to the other. Thereby, the third arm 14 is rotatable around a third rotation shaft O3 in parallel to the horizontal direction (about the third rotation shaft O3) with respect to the second arm 13. The third rotation shaft O3 is parallel to the second rotation shaft O2. The rotation about the third rotation shaft O3 is performed by driving of the third drive source 403. Further, the third drive source 403 is driven by a motor 403M and a cable (not shown), and the motor 403M is controlled by the robot control apparatus via a motor driver 303 electrically connected thereto. Note that the third drive source 403 may be adapted to transmit the drive power from the motor 403M by a reducer (not shown) provided with the motor 403M, or the reducer may be omitted.

The third arm 14 and the fourth arm 15 are coupled via a joint 174. The joint 174 has a mechanism that rotatably supports one of the third arm 14 and the fourth arm 15 coupled to each other with respect to the other. Thereby, the fourth arm 15 is rotatable around a fourth rotation shaft O4 in parallel to the center shaft direction of the third arm 14 (about the fourth rotation shaft O4) with respect to the third arm 14. The fourth rotation shaft O4 is orthogonal to the third rotation shaft O3. The rotation about the fourth rotation shaft O4 is performed by driving of the fourth drive source 404. Further, the fourth drive source 404 is driven by a motor 404M and a cable (not shown), and the motor 404M is controlled by the robot control apparatus via a motor driver 304 electrically connected thereto. Note that the fourth drive source 404 may be adapted to transmit the drive power from the motor 404M by a reducer (not shown) provided with the motor 404M, or the reducer may be omitted. The fourth rotation shaft O4 may be parallel to the shaft orthogonal to the third rotation shaft O3, or the fourth rotation shaft O4 may be different in shaft direction from the third rotation shaft O3, not orthogonal thereto.

The fourth arm 15 and the fifth arm 16 are coupled via a joint 175. The joint 175 has a mechanism that rotatably supports one of the fourth arm 15 and the fifth arm 16 coupled to each other with respect to the other. Thereby, the fifth arm 16 is rotatable around a fifth rotation shaft O5 orthogonal to the center shaft direction of the fourth arm 15 (about the fifth rotation shaft O5) with respect to the fourth arm 15. The fifth rotation shaft O5 is orthogonal to the fourth rotation shaft O4. The rotation about the fifth rotation shaft O5 is performed by driving of the fifth drive source 405. Further, the fifth drive source 405 is driven by a motor 405M and a cable (not shown), and the motor 405M is controlled by the robot control apparatus via a motor driver 305 electrically connected thereto. Note that the fifth drive source 405 may be adapted to transmit the drive power from the motor 405M by a reducer (not shown) provided with the motor 405M, or the reducer may be omitted. The fifth rotation shaft O5 may be parallel to the shaft orthogonal to the fourth rotation shaft O4, or the fifth rotation shaft O5 may be different in shaft direction from the fourth rotation shaft O4, not orthogonal thereto.

The fifth arm 16 and the sixth arm 17 are coupled via a joint 176. The joint 176 has a mechanism that rotatably supports one of the fifth arm 16 and the sixth arm 17 coupled to each other with respect to the other. Thereby, the sixth arm 17 is rotatable around the sixth rotation shaft O6 (about the sixth rotation shaft O6) with respect to the fifth arm 16. The sixth rotation shaft O6 is orthogonal to the fifth rotation shaft O5. The rotation about the sixth rotation shaft O6 is performed by driving of the sixth drive source 406. Further, the sixth drive source 406 is driven by a motor 406M and a cable (not shown), and the motor 406M is controlled by the robot control apparatus via a motor driver 306 electrically connected thereto. Note that the sixth drive source 406 may be adapted to transmit the drive power from the motor 406M by a reducer (not shown) provided with the motor 406M, or the reducer may be omitted. The fifth rotation shaft O5 may be parallel to the shaft orthogonal to the fourth rotation shaft O4, the sixth rotation shaft O6 may be parallel to the shaft orthogonal to the fifth rotation shaft O5, or the sixth rotation shaft O6 may be different in shaft direction from the fifth rotation shaft O5, not orthogonal thereto.

The robot 1 driving in the above described manner controls the actions of the arms 12 to 17 etc. while grasping a precision apparatus, a part, or the like with the hand 91 connected to the distal end of the sixth arm 17, and thereby, may perform respective work of carrying the precision apparatus, the part, or the like. The driving of the hand 91 is controlled by the robot control apparatus.

As above, the configuration of the robot 1 is briefly explained.

Next, referring to FIGS. 3, 4, 5A to 5E, and 6, the relationships among the arms 12 to 17 will be explained, and the explanation will be made from various viewpoints with different expressions etc. Further, the third arm 14, the fourth arm 15, the fifth arm 16, and the sixth arm 17 are considered in a condition that they are stretched straight, in other words, in a condition that the fourth rotation shaft O4 and the sixth rotation shaft O6 are aligned or in parallel.

First, as shown in FIG. 3, a length L1 of the first arm 12 is set to be longer than a length L2 of the second arm 13.

Here, the length L1 of the first arm 12 is a distance between the second rotation shaft O2 and a center line 611 extending in the leftward and rightward directions in FIG. 3 of a bearing part 61 (a member of the joint 171) that rotatably supports the first arm 12 as seen from the shaft direction of the second rotation shaft O2. Further, the length L2 of the second arm 13 is a distance between the second rotation shaft O2 and the third rotation shaft O3 as seen from the shaft direction of the second rotation shaft O2.

Further, as shown in FIG. 4, the robot 1 is adapted so that an angle θ formed between the first arm 12 and the second arm 13 may be 0° as seen from the shaft direction of the second rotation shaft O2. That is, the robot 1 is adapted so that the first arm 12 and the second arm 13 may overlap as seen from the shaft direction of the second rotation shaft O2. The second arm 13 is adapted so that, when the angle θ is 0°, i.e., the first arm 12 and the second arm 13 overlap as seen from the shaft direction of the second rotation shaft O2, the second arm 13 may not interfere with the second portion 122 of the first arm 12 and the ceiling surface 102.

Here, the angle θ formed by the first arm 12 and the second arm 13 is an angle formed by a straight line passing through the second rotation shaft O2 and the third rotation shaft O3 (a center axis of the second arm 13 as seen from the shaft direction of the second rotation shaft O2) 621 and the first rotation shaft O1 as seen from the shaft direction of the second rotation shaft O2 (see FIG. 3).

Furthermore, as shown in FIG. 4, the robot 1 is adapted so that the second arm 13 and the third arm 14 may overlap as seen from the shaft direction of the second rotation shaft O2. That is, the robot 1 is adapted so that the first arm 12, the second arm 13, and the third arm 14 may overlap at the same time as seen from the shaft direction of the second rotation shaft O2.

A total length L3 of the third arm 14, the fourth arm 15, the fifth arm 16, and the sixth arm 17 is set to be longer than the length L2 of the second arm 13. Thereby, as seen from the shaft direction of the second rotation shaft O2, when the second arm 13 and the third arm 14 are overlapped, the distal end of the robot arm 5, i.e., the distal end of the sixth arm 17 may be protruded from the second arm 13. Therefore, the hand 91 may be prevented from interfering with the first arm 12 and the second arm 13.

Here, the total length L3 of the third arm 14, the fourth arm 15, the fifth arm 16, and the sixth arm 17 is a distance between the third rotation shaft O3 and the distal end of the sixth arm 17 as seen from the shaft direction of the second rotation shaft O2 (see FIG. 4). In this case, regarding the third arm 14, the fourth arm 15, the fifth arm 16, and the sixth arm 17, the fourth rotation shaft O4 and the sixth rotation shaft O6 are aligned or in parallel as shown in FIG. 4.

In the robot 1, as shown in FIGS. 5A, 5B, 5C, 5D, 5E, by rotation of the second arm 13 without rotation of the first arm 12, the distal end of the second arm 13 may be moved to a position different by 180° about the first rotation shaft O1 through the state in which the angle θ is 0° as seen from the shaft direction of the second rotation shaft O2. Accordingly, the distal end of the robot arm 5 (the distal end of the sixth arm 17) may be moved from a position (first position) shown in FIG. 5A to a position (second position) shown in FIG. 5E different by 180° about the first rotation shaft O1 from the position shown in FIG. 5A through the state in which the first arm 12 and the second arm 13 overlap as shown in FIG. 5C. Therefore, as shown in FIG. 6, the robot 1 performs an action of moving the hand 91 on a straight line as shown by an arrow 56 without actions of moving the hand 91 as shown by arrows 57, 58, and thereby, may move the distal end of the second arm 13 to the position different by 180° about the first rotation shaft O1. Note that, in the movement, the third arm 14, the fourth arm 15, the fifth arm 16, and the sixth arm 17 are respectively rotated as appropriate.

The robot arm 5 may be driven as described above, and thereby, the space (installation region) for preventing the robot 1 from interfering may be made smaller. Accordingly, as shown in FIG. 6, the width (horizontal length) W of the installation region in which the robot 1 is installed may be made smaller than a width WX of related art. The width W is e.g. 80% of the width WX or less.

Further, when moving the hand 91 to the position different by 180° about the first rotation shaft O1 as shown in FIGS. 5A to 5E, the robot 1 may move the hand 91 with little change of the height of the distal end of the robot arm 5 (at the nearly constant height). Accordingly, the height of the installation region of the robot 1 (the height in the vertical direction) may be made lower than the height of related art, specifically, e.g. 80% of the height of related art or less.

Next, referring to FIGS. 7 to 15D, examples of work performed by the robot 1 and actions of the robot 1 at the work will be explained.

Here, as shown in FIG. 7, an operation of the robot 1 at work by the robot 1 of grasping and carrying a part (not shown) in a position (first point) A on a work surface 71 to a position (second point) B, and then, grasping and carrying a part (not shown) in a position (third point) C to a position (fourth point) D is explained. In the work, the robot 1 performs the operation of moving the hand 91 through the position A, the position B, the position C, and the position D by driving the robot arm 5.

Note that, as shown in FIG. 7, the base 11 of the robot 1 is attached to the ceiling 101 so that the respective separation distances between the position A, the position B, the position C, and the position D and the base 11 may be nearly equal as seen from the direction of the first rotation shaft O1. Further, hereinafter, in FIGS. 7, 8A to 8D, 10A to 10D, 12A to 12D, and 14A to 14D, the counter-clockwise direction about the first rotation shaft O1 is referred to as "negative direction" and the clockwise direction about the first rotation shaft O1 is referred to as "positive direction".

Movement from Position A to Position B

First, as shown in FIGS. 8A to 8D and 9A to 9D, the robot 1 moves the hand 91 from the position A to the position B by driving the robot arm 5.

Figure 9D:
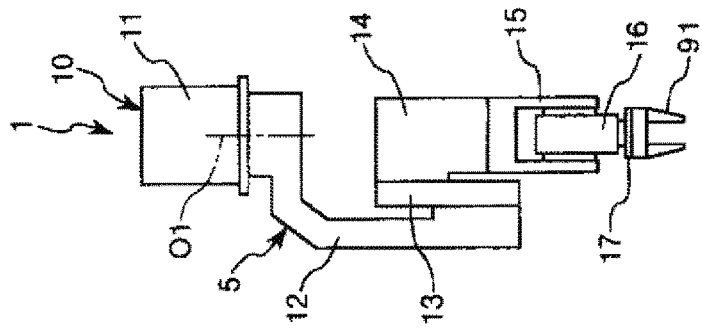
FIGS. 9A to 9D are side views for explanation of the actions of the robot when the distal end of the robot arm shown in FIG. 1 is moved from the position A to the position B.
Figure 9C:
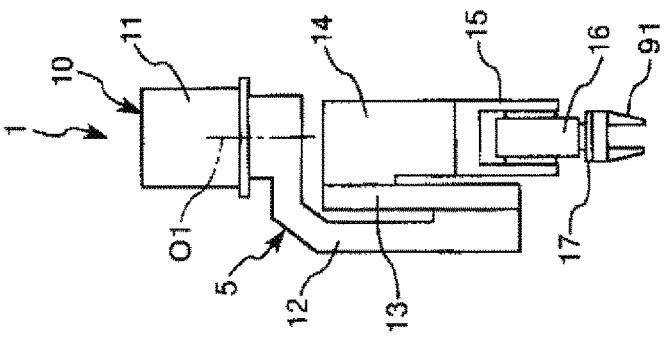
Figure 9B:
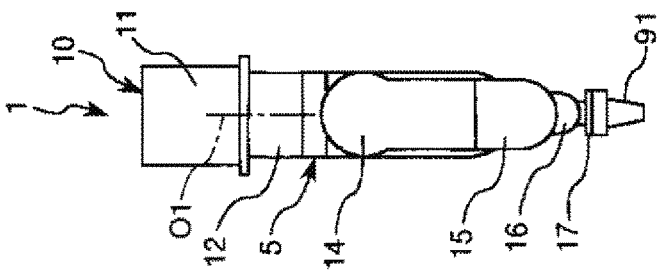
Figure 9A:
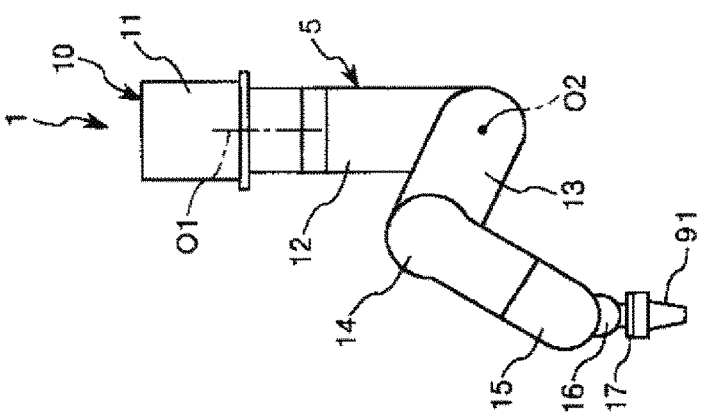

In this regard, first, the robot 1 rotates the second arm 13 from a state in which the second arm 13 and the first arm 12 do not overlap as seen from the shaft direction of the second rotation shaft O2 as shown in FIGS. 8A and 9A to a state in which the second arm 13 and the first arm 12 overlap as seen from the shaft direction of the second rotation shaft O2 as shown in FIGS. 8B and 9B. Note that, hereinafter, the operation of rotating the second arm 13 to overlap with the first arm 12 as seen from the shaft direction of the second rotation shaft O2 is referred to as "first operation".

Then, as shown in FIGS. 8C and 9C, the robot 1 rotates the first arm 12 about the first rotation shaft O1 with the first arm 12 and the second arm 13 remaining overlap. Here, the first arm 12 is rotated to 90° in the negative direction (−90°). Hereinafter, the operation of rotating the first arm 12 about the first rotation shaft O1 is referred to as "second operation".

Then, as shown in FIGS. 8D and 9D, the robot 1 rotates the second arm 13 to eliminate overlap between the second arm 13 and the first arm 12 so that the second arm 13 and the first arm 12 may not overlap. Note that, hereinafter, the operation of rotating the second arm 13 to eliminate the overlap between the second arm 13 and the first arm 12 as seen from the shaft direction of the second rotation shaft O2 is referred to as "third operation".

In this manner, the robot 1 may move the hand 91 to the position B different by 90° in the negative direction about the first rotation shaft O1 from the position A.

Between the position A and the position B, the robot 1 performs the operation of rotating the first arm 12 to 90° in the negative direction. Further, the robot 1 performs the operation of returning the second arm 13 and the third arm 14 to the state shown in FIG. 5A again via the state shown in FIG. 5A through the state shown in FIG. 5C. Therefore, the robot 1 rotates the first arm 12 to 90° in the negative direction, and thereby, moves the hand 91 from the position A to the position B. Note that, in the embodiment, the first operation and the third operation are performed while the hand 91 is moved from the position A to the position B, however, the first operation and the third operation are not necessarily performed in the while.

Further, in the above described first operation, second operation, and third operation, fine adjustment may be performed by rotating an arbitrary one of the fourth arm 15, the fifth arm 16, and the sixth arm 17 as appropriate.

Movement from Position B to Position C

Then, as shown in FIGS. 10A to 10D and 11A to 11D, the robot 1 moves the hand 91 from the position B to the position C by driving the robot arm 5.

Figure 11A:
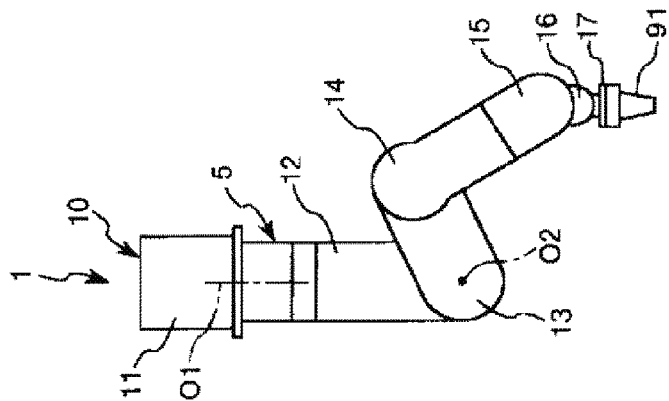
FIGS. 11A to 11D are side views for explanation of the actions of the robot when the distal end of the robot arm shown in FIG. 1 is moved from the position B to the position C.
Figure 11B:
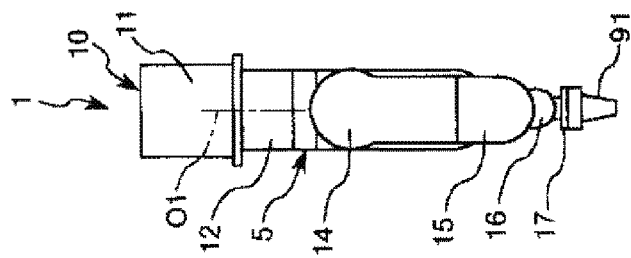

The robot 1 performs the first operation from a state in which the second arm 13 and the first arm 12 do not overlap as seen from the shaft direction of the second rotation shaft O2 as shown in FIGS. 10A and 11A to rotate the second arm 13 to overlap with the first arm 12 as seen from the shaft direction of the second rotation shaft O2 as shown in FIGS. 10B and 11B.

Figure 11C:
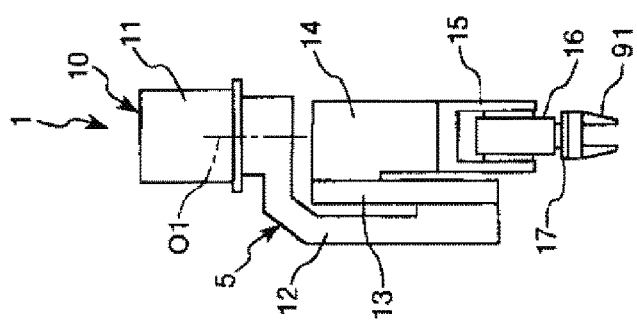

Then, the robot performs the second operation as shown in FIGS. 10C and 11C. In the second operation, the first arm. 12 is rotated to 90° in the positive direction)(+90°. That is, the first arm 12 is rotated in the opposite direction to that when the hand 91 is moved from the position A to the position B as described above.

Figure 11D:
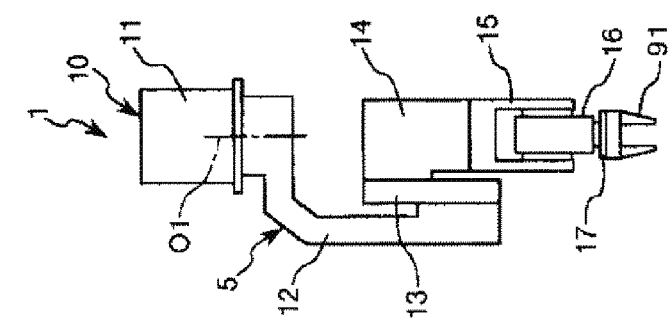

Then, the robot performs the third operation as shown in FIGS. 10D and 11D to move the second arm 13 not to overlap with the first arm 12.

In this manner, the robot 1 may move the hand 91 to the position C different by 90° in the negative direction about the first rotation shaft O1 from the position B.

Between the position B and the position C, the robot 1 performs the operation of rotating the first arm 12 to 90° in the positive direction. Further, the robot 1 performs the operation of moving the second arm 13 and the third arm 14 to the position different by 180° about the first rotation shaft O1 shown in FIG. 5E from the state shown in FIG. 5A via the state in which an angle θ is 0° as shown in FIG. 5C. As described above, the robot 1 rotates the first arm 12, the second arm 13, and the third arm 14, and thereby, moves the hand 91 from the position B to the position C.

Movement from Position C to Position D

Then, as shown in FIGS. 12A to 12D and 13A to 13D, the robot 1 moves the hand 91 from the position C to the position D by driving the robot arm 5. In this regard, the robot 1 performs the same operation as the operation of moving the hand 91 from the position A to the position B. That is, first, the robot 1 performs the first operation from a state in which the second arm 13 and the first arm 12 do not overlap as shown in FIGS. 12A and 13A to a state in which the first arm 12 and the second arm 13 overlap as shown in FIGS. 12B and 13B. Then, the robot performs the second operation of rotating the first arm to 90° in the negative direction)(−90° as shown in FIGS. 12C and 13C. Then, the robot performs the third operation as shown in FIGS. 12D and 13D to move the second arm 13 not to overlap with the first arm 12.

In this manner, the robot 1 rotates the first arm 12 to 90° in the negative direction. Thereby, the hand 91 may be moved to the position D different by 90° in the negative direction about the first rotation shaft O1 from the position C. Note that, in the embodiment, the first operation and the third operation are performed while the hand 91 is moved from the position C to the position D, however, the first operation and the third operation are not necessarily performed in the while.

Movement from Position D to Position A

Figure 15D:
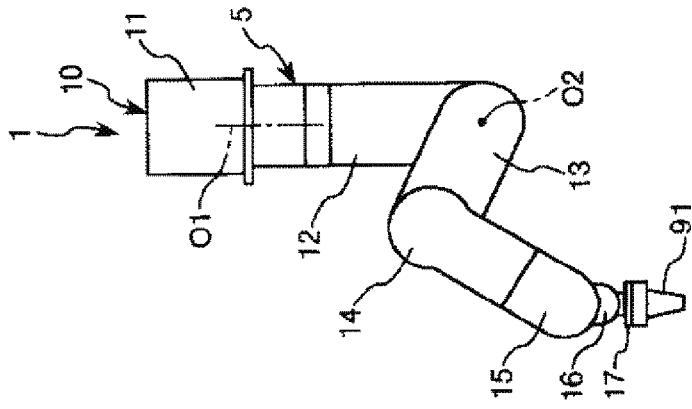
FIGS. 15A to 15D are side views for explanation of the actions of the robot when the distal end of the robot arm shown in FIG. 1 is moved from the position D to the position A.
Figure 15C:
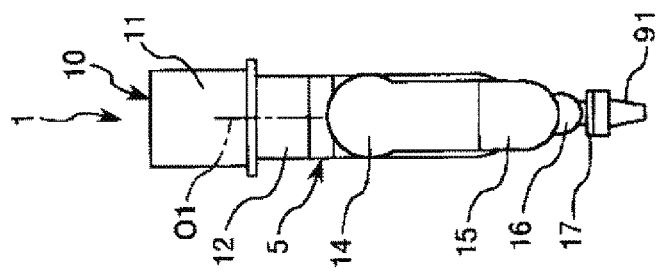
Figure 15B:
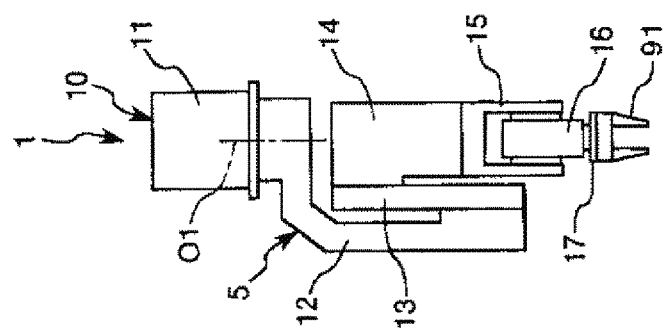
Figure 15A:
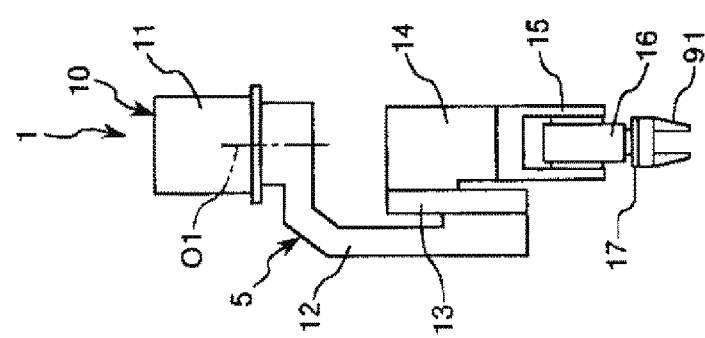

Then, as shown in FIGS. 14A to 14D and 15A to 15D, the robot 1 moves the hand 91 from the position D to the position A by driving the robot arm 5. In this regard, the robot 1 performs the same operation as the operation of moving the hand 91 from the position B to the position C. That is, first, the robot performs the first operation from a state in which the second arm 13 and the first arm 12 do not overlap as shown in FIGS. 14A and 15A to a state in which the first arm 12 and the second arm 13 overlap as shown in FIGS. 14B and 15B. Then, the robot performs the second operation of rotating the first arm to 90° in the positive direction)(+90° as shown in FIGS. 14C and 15C. Then, the robot performs the third operation as shown in FIGS. 14D and 15D to move the second arm 13 not to overlap with the first arm 12.

In this manner, the robot 1 rotates the first arm 12 to 90° in the positive direction, and rotates the second arm 13 and the third arm 14 to move the distal end of the second arm 13 to the position different by 180° about the first rotation shaft O1. Thereby, the hand 91 may be moved to the position different by 90° about the first rotation shaft O1 in the negative direction from the position D.

As described above, the robot 1 may move the hand 91 through the position A, the position B, the position C, and the position D by moving the hand 91 (the distal end of the robot arm 5) to 90° at a time. That is, the robot may rotate the hand 91 to 360° about the first rotation shaft O1.

When the hand 91 is rotated to 360° about the first rotation shaft O1, as described above, the first arm 12 sequentially rotates to 90° in the negative direction, 90° in the positive direction, 90° in the negative direction, and 90° in the positive direction. That is, the first arm 12 rotates within a range of 90°. On the other hand, the hand 91 rotates to 360°.

As described above, in the robot 1, the first arm 12 is rotated within the range of 90°, not rotated to 360° about the first rotation shaft O1, and thereby, may rotate the hand 91 (the distal end of the robot arm 5) to 360° about the first rotation shaft O1. This is because, as described above, the robot 1 moves the distal end of the second arm 13 to the position different by 180° about the first rotation shaft O1 in the amount of the positive rotation of the first arm 12 to 90° when moving the hand 91 from the position B to the position C and when moving the hand 91 from the position D to the position A. Accordingly, even when the first arm 12 is rotated to 90° in the positive direction, the hand 91 may be rotated to 90° in the negative direction as a result.

Further, the above described operation of moving the hand through the position A, the position B, the position C, and the position D is repeated, and thereby, the hand 91 may be rotated to 360°×m (m is equal to or more than ±2) by rotating the first arm 12 within the range of 90° without rotating the arm to 360° about the first rotation shaft O1. Note that the m is an integer equal to more than one. Thereby, for example, entanglement of the respective cables (wires) connecting the respective motors 401M to 406M of the robot 1 and the robot control apparatus etc. may be reduced. Further, blocking of rotation of the robot arm 5 by the respective cables etc. may be avoided.

Furthermore, in the embodiment, the first operation of rotating the first arm 12 within the range of 90° about the first rotation shaft O1 is performed, however, the rotation angle of the first arm 12 about the first rotation shaft O1 in the first operation is not limited to 90°.

The rotation angle of the first arm 12 in the first operation may be from −360° (360° in the negative direction) to +360° (360° in the positive direction), and preferably from −135° (135° in the negative direction) to +135° (135° in the positive direction). The first arm. 12 is rotated in the range, and thereby, the hand 91 may be rotated to 360°×m while blocking of rotation of the robot arm 5 by the respective cables etc. is avoided.

When the hand 91 is moved from the position A to the position B by the above described driving of the robot arm 5, as shown in FIG. 7, the distal end of the robot arm 5 may be moved in a path sequentially passing through the position A, on the first rotation shaft, and the position B as seen from the direction of the first rotation shaft O1. That is, the hand 91 may be moved on a line segment (straight line) J11 connecting the position A and the first rotation shaft O1 and a line segment (straight line) J12 connecting the position B and the first rotation shaft O1. In the same manner, the robot 1 may move the hand 91 on line segments J21, J22, J31, J32, J41, J42 through the position B, the position C, and the position D. Thereby, for example, even when an obstacle or the like exists between the position A and the position B, the obstacle may be avoided. Note that the same applies to between the position B and the position C, between the position C and the position D, and between the position D and the position A.

In the above described explanation, the second operation is performed after the first operation, however, the second operation may be preformed while the first operation is performed. Further, in the above described explanation, the third operation is performed after the second operation, however, the third operation may be preformed while the second operation is performed. In this case, the hand 91 may be moved on curves C1, C2, C3, C4 shown in FIG. 16. Thereby, the hand 91 may be moved from the present position to a target position in a shorter path.

As described above, the timing of the first operation, the second operation, and the third operation is controlled, and thereby, the distance, the presence or absence of an obstacle from the present position to the target position of the hand 91 may be grasped and the hand 91 may be moved to the target position in the shorter path in which the obstacle may be avoided.

Here, referring to FIGS. 17A and 17B, the configurations of a robot 1X of related art and the robot 1 of the embodiment are compared.

The robot 1X having the configuration of related art shown in FIG. 17A is a robot in which a base 11X, a first arm 12X, a second arm 13X, a third arm 14X, a fourth arm 15X, a fifth arm 16X, and a sixth arm 17X are sequentially coupled from the proximal end side toward the distal end side. Note that the first arm 12X connected to the base 11X is rotatable about a first rotation shaft O1X in parallel to the vertical direction. Further, the second arm 13X connected to the first arm 12X is rotatable about a second rotation shaft O2X in parallel to the horizontal direction.

The robot 1X does not have a configuration in which the distal end of the second arm 13X may be moved through a state in which the first arm 12X and the second arm 13X overlap as seen from the shaft direction of the second rotation shaft O2X to a position different by 180° about the first rotation shaft O1X. Accordingly, when the operation of moving through the position A, the position B, the position C, and the position D is performed using the robot 1X of related art, it is necessary to rotate the first arm 12X to 360° about the first rotation shaft O1X.

Then, in the robot 1X of related art, in order to rotate a hand 91X in the same direction to 360°×m, it is necessary to rotate the first arm 12X to 360°×m about the first rotation shaft O1X.

Accordingly, in the robot 1X of related art, for avoiding blocking of the rotation of a robot arm 5X (the first arm 12X, the second arm 13X, the third arm 14X, the fourth arm 15X, the fifth arm 16X, and the sixth arm 17X) by cables etc., in order to move the hand 91X to the position A after the operation of moving the hand through the position A, the position B, the position C, and the position D, for example, it is necessary to perform an operation opposite to the movement. That is, it is necessary to perform the operation of moving the hand through the position D, the position C, the position B, and the position A.

On the other hand, as described above, in the robot 1 of the embodiment shown in FIG. 17B, the length of the first arm 12 is made longer than the length of the second arm 13, and thereby, the hand 91 can be moved to the position different by 180° about the first rotation shaft O1 after the state in which the first arm 12 and the second arm 13 overlap. Accordingly, in the robot 1, as described above, the rotation of the robot arm 5 does not blocked by the cables etc., and the hand 91 (the distal end of the robot arm 5) may be rotated to 360° about the first rotation shaft O1.

Further, according to the robot 1, when the hand 91 is moved, the operation with less actions of the robot 1 may be selected. For example, in consideration of the amount of movement from the present position to the target position of the hand 91 or the like, the first arm 12 is not rotated or the action that may make the rotation angle of the first arm 12 smaller is selected. In this manner, in the robot 1, the action with the less amount of rotation of the first arm 12 is selected, and thereby, the takt time may be shortened and the work efficiency may be improved.

Here, a modified example of the robot 1 is shown in FIG. 18.

In a robot 1A as the modified example of the robot 1, the second arm 13 has a larger width along the horizontal direction in FIG. 18 than that of a third portion 123 of the first arm 12 as seen from the shaft direction of the second rotation shaft O2. Even in the robot 1A having the configuration, the hand 91 may be moved to the position different by 180° about the first rotation shaft O1 through the state in which the first arm 12X and the second arm 13 overlap. Also, in the robot 1A, the state shown in FIG. 18 is the state in which the first arm 12X and the second arm 13 overlap.

As above, the robot according to the invention is explained according to the illustrated embodiments, however, the invention is not limited to those and the configurations of the respective parts may be replaced by arbitrary configurations having the same functions. Further, other arbitrary configurations may be added. Furthermore, the invention may include a combination of two or more arbitrary configurations (features) of the above described respective embodiments.

In the above described embodiments, the number of rotation shafts of the robot arm of the robot is six, however, the invention is not limited to that. The number of rotation shafts of the robot arm may be e.g. two, three, four, five, or seven or more.

Further, in the above described embodiments, the number of robot arms of the robot is one, however, the invention is not limited to that. The number of robot arms of the robot may be e.g. two or more. That is, the robot may be e.g. a multi-arm robot including a dual-arm robot. Furthermore, in the invention, the robot (robot main body) may be a robot of another type. Specific examples include e.g. a legged walking (mobile) robot having leg parts.

Further, in the above described embodiments, regarding conditions (relationships) of an nth rotation shaft, an nth arm, an (n+1)th rotation shaft, and an (n+1)th arm defined in the appended claims, the case where n is one, i.e., the case where the first rotation shaft, the first arm, the second rotation shaft, and the second arm satisfy the conditions is explained, however, the invention is not limited to that. The n may be an integer of one or more, and the same conditions as those in the case where n is one may be satisfied with respect to an arbitrary integer equal to or more than one. Therefore, for example, the case where n is two, i.e., the case where the second rotation shaft, the second arm, the third rotation shaft, and the third arm may satisfy the same conditions as those in the case where n is one, the case where n is three, i.e., the case where the third rotation shaft, the third arm, the fourth rotation shaft, and the fourth arm may satisfy the same conditions as those in the case where n is one, the case where n is four, i.e., the case where the fourth rotation shaft, the fourth arm, the fifth rotation shaft, and the fifth arm may satisfy the same conditions as those in the case where n is one, or, the case where n is five, i.e., the case where the fifth rotation shaft, the fifth arm, the sixth rotation shaft, and the sixth arm may satisfy the same conditions as those in the case where n is one.

Further, in the above described embodiments, the length of the nth arm is made longer than the length of the (n+1)th arm, and thereby, the nth arm and the (n+1)th arm can overlap as seen from the shaft direction of the (n+1)th rotation shaft. However, a configuration in which the length of the nth arm is shorter than the length of the (n+1)th arm or a configuration in which the length of the nth arm is equal to the length of the (n+1)th arm may be employed if the nth arm and the (n+1)th arm can overlap as seen from the shaft direction of the (n+1)th rotation shaft.

Furthermore, in the above described embodiments, the explanation supposing that the position A is the first point, the position B is the second point, the position C is the third point, and the position D is the fourth point is made. However, for example, the position B may be regarded as the first point, the position C may be regarded as the second point, the position D may be regarded as the third point, and the position A may be regarded as the fourth point. That is, the present position of the distal end of the robot arm is set to the first point, and a position as a target of movement may be regarded as the second point.

The entire disclosure of Japanese Patent Application No. 2015-071198, filed Mar. 31, 2015 is expressly incorporated by reference herein.

What is claimed is:
1. A robot comprising:
a robot arm having a first arm, a second arm, a third arm, a fourth arm, a fifth arm, and a sixth arm, wherein
the first arm is rotatable about a first rotation axis,
the second arm is connected to the first arm and is rotatable about a second rotation axis having an axis direction different from an axis direction of the first rotation axis and being orthogonal to the first rotation axis when viewed from a direction orthogonal to both the first rotation axis and the second rotation axis,
the third arm is connected to the second arm and is rotatable about a third rotation axis which is parallel to the second rotation axis,
the fourth arm is connected to the third arm and is rotatable about a fourth rotation axis which is orthogonal to the third rotation axis when viewed from a direction orthogonal to both the third rotation axis and the fourth rotation axis,
the fifth arm is connected to the fourth arm and is rotatable about a fifth rotation axis which is orthogonal to the fourth rotation axis when viewed from a direction orthogonal to both the fourth rotation axis and the fifth rotation axis,
the sixth arm is connected to the fifth arm and is rotatable about a sixth rotation axis which is orthogonal to the fifth rotation axis when viewed from a direction orthogonal to both the fifth rotation axis and the sixth rotation axis,
when in a first position, the first arm, the second arm, and the third arm overlap with one another when viewed from an axial direction of the second rotation axis and the third arm is closer to the first rotation axis than the second arm,
the first arm includes a first segment extending parallel to the second rotation axis and a second segment extending parallel to the first rotation axis, the first segment and the second segment being a single monolithic piece such that a position of the first segment relative to the second segment is fixed and the first segment and the second segment, together, rotate about the first rotation axis,
the second segment of the first arm connects to the second arm in a connection portion which positions the second arm spaced apart from the second segment such that the second arm rotates about the second rotation axis without contacting the second segment, and
when a distal end of the robot arm is moved from a first point to a second point, a first operation where the first arm and the second arm overlap as seen from the axis direction of the second rotation axis and a second operation of rotating the first arm are performed.

2. The robot according to claim 1, wherein the first operation is an operation such that an angle formed by the first arm and the second arm is 0° as seen from the axis direction of the second rotation axis.

3. The robot according to claim 1, wherein the second operation is performed after the first operation.

4. The robot according to claim 1, wherein the second operation is performed while the first operation is performed.

5. The robot according to claim 1, wherein a rotation angle of the first arm is from −135° to +135° in the second operation.

6. The robot according to claim 1, wherein a length of the first arm is longer than a length of the second arm.

7. The robot according to claim 1, further comprising a base,
wherein the first arm is provided on the base.

8. A robot comprising:
a robot arm having a first arm, a second arm, a third arm, a fourth arm, a fifth arm, and a sixth arm, wherein
the first arm is rotatable about a first rotation axis,
the second arm is connected to the first arm and is rotatable about a second rotation axis having an axis direction different from an axis direction of the first rotation axis and being orthogonal to the first rotation axis when viewed from a direction orthogonal to both the first rotation axis and the second rotation axis,
the third arm is connected to the second arm and is rotatable about a third rotation axis which is parallel to the second rotation axis,
the fourth arm is connected to the third arm and is rotatable about a fourth rotation axis which is orthogonal to the third rotation axis when viewed from a direction orthogonal to both the third rotation axis and the fourth rotation axis, the fifth arm is connected to the fourth arm and is rotatable about a fifth rotation axis which is orthogonal to the fourth rotation axis when viewed from a direction orthogonal to both the fourth rotation axis and the fifth rotation axis, the sixth arm is connected to the fifth arm and is rotatable about a sixth rotation axis which is orthogonal to the fifth rotation axis when viewed from a direction orthogonal to both the fifth rotation axis and the sixth rotation axis, when in a first position, the first arm, the second arm, and the third arm overlap with one another when viewed from an axial direction of the second rotation axis and the third arm is closer to the first rotation axis than the second arm, the first arm includes a first segment extending parallel to the second rotation axis and a second segment extending parallel to the first rotation axis, the first segment and the second segment being a single monolithic piece such that a position of the first segment relative to the second segment is fixed and the first segment and the second segment, together, rotate about the first rotation axis, the second segment of the first arm connects to the second arm in a connection portion which positions the second arm spaced apart from the second segment such that the second arm rotates about the second rotation axis without contacting the second segment, and when a distal end of the robot arm is rotated to 360°×m (m is equal to or more than ±2) as seen from the axis direction of the first rotation axis, a rotation angle of the first arm is larger than −360° and smaller than +360°.

\* \* \* \* \*